United States Patent [19]
Pawelzik et al.

[11] Patent Number: 5,199,790
[45] Date of Patent: Apr. 6, 1993

[54] BATTERY-POWERED TEMPERATURE INDICATOR FOR FAUCET

[75] Inventors: Manfred Pawelzik, Soest; Heinz Brandebusemeyer, Menden, both of Fed. Rep. of Germany

[73] Assignee: Friedrich Grohe Aktiengesellschaft, Hemer, Fed. Rep. of Germany

[21] Appl. No.: 894,726

[22] Filed: Jun. 4, 1992

[30] Foreign Application Priority Data

Jun. 19, 1991 [DE] Fed. Rep. of Germany ....... 4120348

[51] Int. Cl.⁵ .......................... G01K 1/14; G01K 13/02
[52] U.S. Cl. ..................................... 374/147; 374/208
[58] Field of Search ............... 374/147, 148, 141, 163, 374/208; 138/104; 285/46, 187, 93; D8/350, 352, 353; D10/57; D23/223, 228; 4/559, 605

[56] References Cited

U.S. PATENT DOCUMENTS

| | | | |
|---|---|---|---|
| 3,952,594 | 4/1976 | McMahan | 374/147 |
| 3,960,016 | 6/1976 | Symmons . | |
| 4,630,940 | 12/1986 | Ostertag et al. | 374/148 |
| 4,968,152 | 11/1990 | Bergmann | 374/147 |
| 5,076,709 | 12/1991 | Tagnotti | 374/147 |

FOREIGN PATENT DOCUMENTS

| | | |
|---|---|---|
| 3330585 | 3/1985 | Fed. Rep. of Germany . |
| 3513549 | 3/1987 | Fed. Rep. of Germany . |
| 188918 | 1/1937 | Switzerland ........................ 374/147 |

*Primary Examiner*—William A. Cuchlinski, Jr.
*Assistant Examiner*—G. Bradley Bennett
*Attorney, Agent, or Firm*—Herbert Dubno; Andrew Wilford

[57] ABSTRACT

A temperature indicator for use in combination with a plumbing fitting through which water passes has a core assembly including a display, a circuit module fixed to and driving the display, a temperature sensor connected to the circuit module, a pair of long battery contacts connected to the module, a finger extending from the module and carrying the long contacts, and a pair of short battery contacts connected to the module in parallel with the long contacts. An inner housing part interfitting with the fitting and traversed by the water is formed with a recess in which the sensor is engageable. A battery is connected to one of the pairs of contacts and the other pair is unused. An outer housing part mounted on the inner housing part carries the core assembly. The finger is constructed to break readily off the assembly.

10 Claims, 4 Drawing Sheets

BATTERY-POWERED TEMPERATURE INDICATOR FOR FAUCET

FIELD OF THE INVENTION

The present invention relates to a battery-powered temperature indicator for a water line. More particularly this invention concerns such an indicator that can be installed right in or on a surface-mount or recessed mixing faucet.

BACKGROUND OF THE INVENTION

It is known to provide an indicator on a hose for a hand shower to indicate the temperature of the water in the device. For instance commonly owned U.S. Pat. No. 5,160,197 Klose describes a hand shower having an upstream end connected to a downstream end of a hose to receive water therefrom by a fitting having a snap coupling and a display. The snap coupling has a male part fixed on one of the ends, a female part fixed on the other of the ends and fittable over the male part, and a latch in the female part for releasably retaining the male part therein. The display is mounted on one of the parts and gives a readout of the temperature of the water flowing through the coupling.

U.S. Pat. No. 3,960,016 of P. Symmons describes a temperature indicator that is mounted in the escutcheon of a recessed mixing valve. This device is wholly mechanical, with a standard bimetallic helix positioned in the flow of mixed water and attached to a rod on which is carried a pointer that is visible adjacent a scale through a window on the escutcheon.

German patent document 3,330,585 filed 25 August 1983 by W. Brunnenkant describes another such arrangement having a housing that is fitted between the mixing valve and the upstream end of the faucet. A sensor in the housing is in heat-conducting relationship with water passing through it and is connected to the input of a battery-powered circuit whose output drives a digital display to show the water temperature.

Such systems are typically very good in their individual applications, but cannot be adapted to different uses. Thus a retrofit temperature indicator that is to be mounted on a faucet or hose is completely different from one that is incorporated in a below-deck or recessed fitting.

OBJECTS OF THE INVENTION

It is therefore an object of the present invention to provide an improved temperature indicator for a plumbing fitting.

Another object is the provision of such an improved temperature indicator for a plumbing fitting which overcomes the above-given disadvantages, that is which can be adapted easily for use with different types of fittings.

SUMMARY OF THE INVENTION

A temperature indicator for use in combination with a plumbing fitting through which water passes has a core assembly including a display, a circuit module fixed to and driving the display, a temperature sensor connected to the circuit module, a pair of long battery contacts connected to the module, a finger extending from the module and carrying the long contacts, and a pair of short battery contacts connected to the module in parallel with the long contacts. An inner housing part interfitting with the fitting and traversed by the water is formed with a recess in which the sensor is engageable. A battery is connected to one of the pairs of contacts and the other pair is unused. An outer housing part mounted on the inner housing part carries the core assembly.

Thus it is possible to use this core assembly with many different types of plumbing fittings. The housing parts are changed, but the core assembly remains the same. The two different sets of contacts allow the battery to be mounted in different positions, with the unneeded contacts being ignored or broken off. In fact according to the invention the finger is formed with a score line so that it can break readily off the core assembly.

The sensor itself is electrical and provided with a flexible output wire connected to the module. In addition it is provided with spring fingers retaining it in the recess. The inner housing part is formed at least around the recess of a material that conducts heat well. A metallic insert is best since the housing parts are normally made of a plastic that conducts poorly.

One system according to the invention uses an inner housing part that is a tube surrounded by the outer housing part. The display and module are mounted on one side of the tube and the battery on the opposite side thereof, with the finger extending around the tube between the sides. It is also possible for the outer housing part to include an escutcheon plate. In this case the outer housing part includes two interfitting elements together holding the core assembly and battery and secured together by snap fingers. The outer housing part and escutcheon plate are provided with snap fingers that secure them together.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
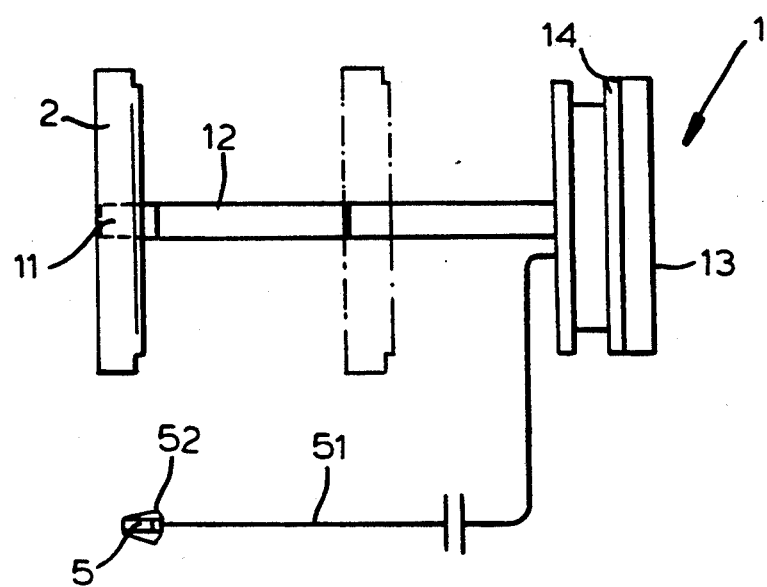
FIG. 1 is a side view of the core assembly of the indicator according to the invention.
Figure 2:
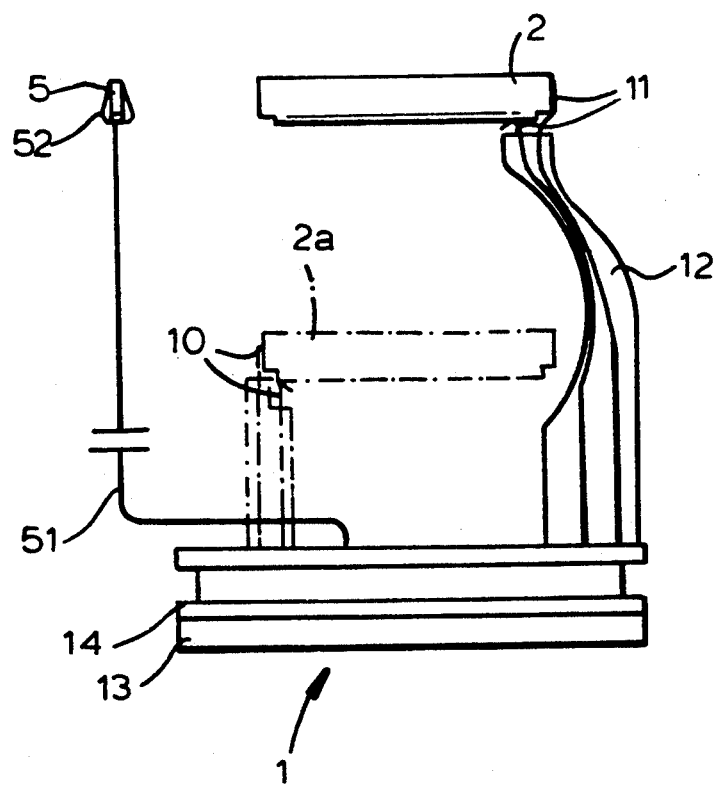
FIG. 2 is a top view of the core assembly.

As seen in FIGS. 1 and 2 a sensor core assembly 1 according to this invention basically comprises a liquid-crystal display 13 operated by a wafer-like solid-state electronics module 14 to which it is laminated. A small sensor 5, for instance a heat-sensitive diode, is connected via an output line or wire 51 to the circuit 14 and is provided with spring arms 52 to allow it to hold in a recess as described below. The circuit 14 is provided with two different but parallel-wired pairs of power contacts 10 and 11 that are set up to engage the face and edge of a standard disk-shaped battery 2 or 2a, depending on application. The contact pair 11 extend along a rigid breakaway tongue projecting back some distance from the module 14 and the other pair 10 is substantially shorter and is used when the battery is to be mounted in the position indicated at 2a in FIG. 2, virtually against the circuit 14. In the latter case the tongue 12 is broken off along with the unneeded contacts 11.

Figure 3:
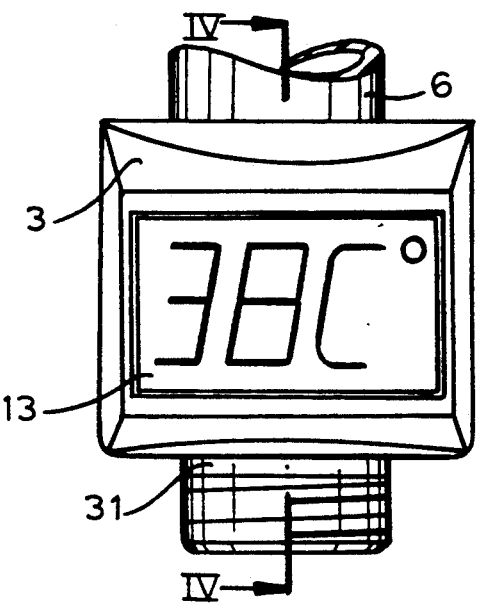
FIG. 3 is a front view of the indicator in a housing for mounting on a mixing faucet.
Figure 4:
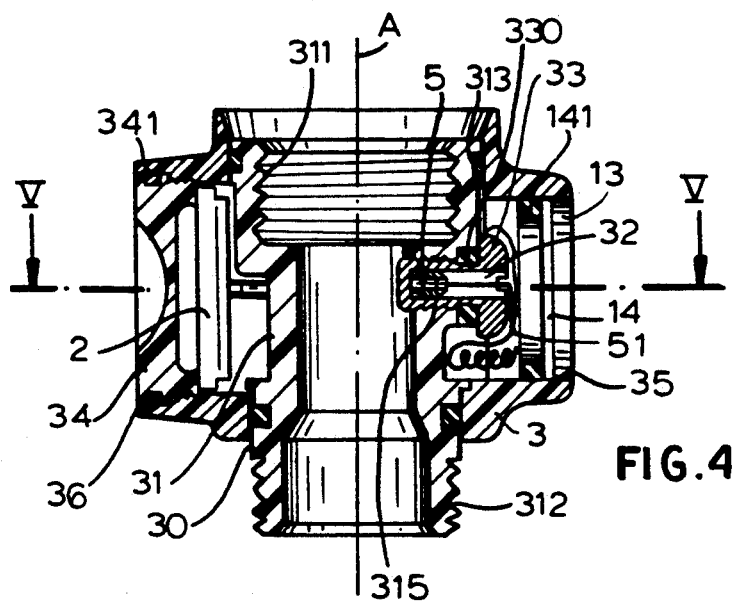
FIG. 4 is an axial section taken along line IV—IV of FIG. 3.
Figure 5:
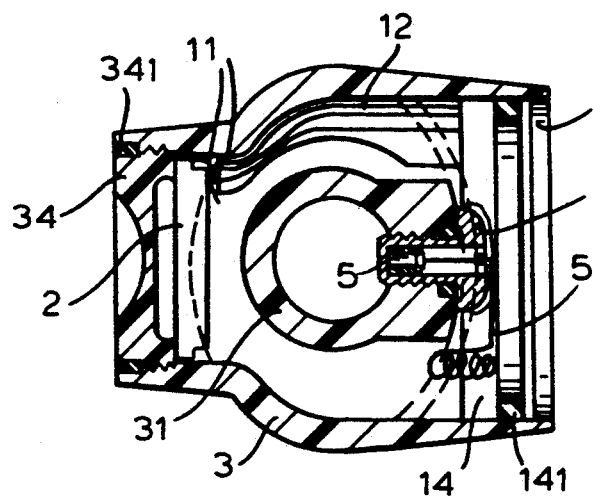
FIG. 5 is a cross section taken along line V—V of FIG. 4.

The system shown in FIGS. 3 through 5 is intended to be mounted directly on the threaded male end of a faucet 6 or hose and itself can be threaded into an aerator, hose, or hand shower or the like. It has two-part housing 3, 31 comprising an annular outer part 3 formed on an axis A with a throughgoing passage 30 in which snugly fits an inner housing part 31 formed at one end with a threaded female recess 311 and at its other end with a complementary threaded male projection 312, seal rings 313 being provided in the passage 30 around the inner tube part 31.

The annular outer housing part 3 is formed on one side with a radially throughgoing aperture 35 and diametrically opposite thereto with another such aperture 36. The display 13 and circuit 14 are snugly received in the aperture 35 with the contact finger 12 extending around the inner part 31 to the aperture 36 where it engages the inner face and edge of the battery 2 which is set in this aperture 36. A plug 34 seated in the aperture 36 retains the battery 2 in place and seal rings 341 and 141 respectively seal around the plug 34 and circuit module 14 in the respective apertures 36 and 35.

The inner housing part 31 is formed with a radially throughgoing hole 315 in which is seated a heat-conducting metallic plug 33 formed with a central blind bore 32 in which the sensor 5 is set. A seal ring 330 is provided between the wall of the hole 315 and the plug 33. Thus the plug 33 will be at the same temperature as the water flowing through the inner part 31, and so will the sensor 5.

Figure 6:
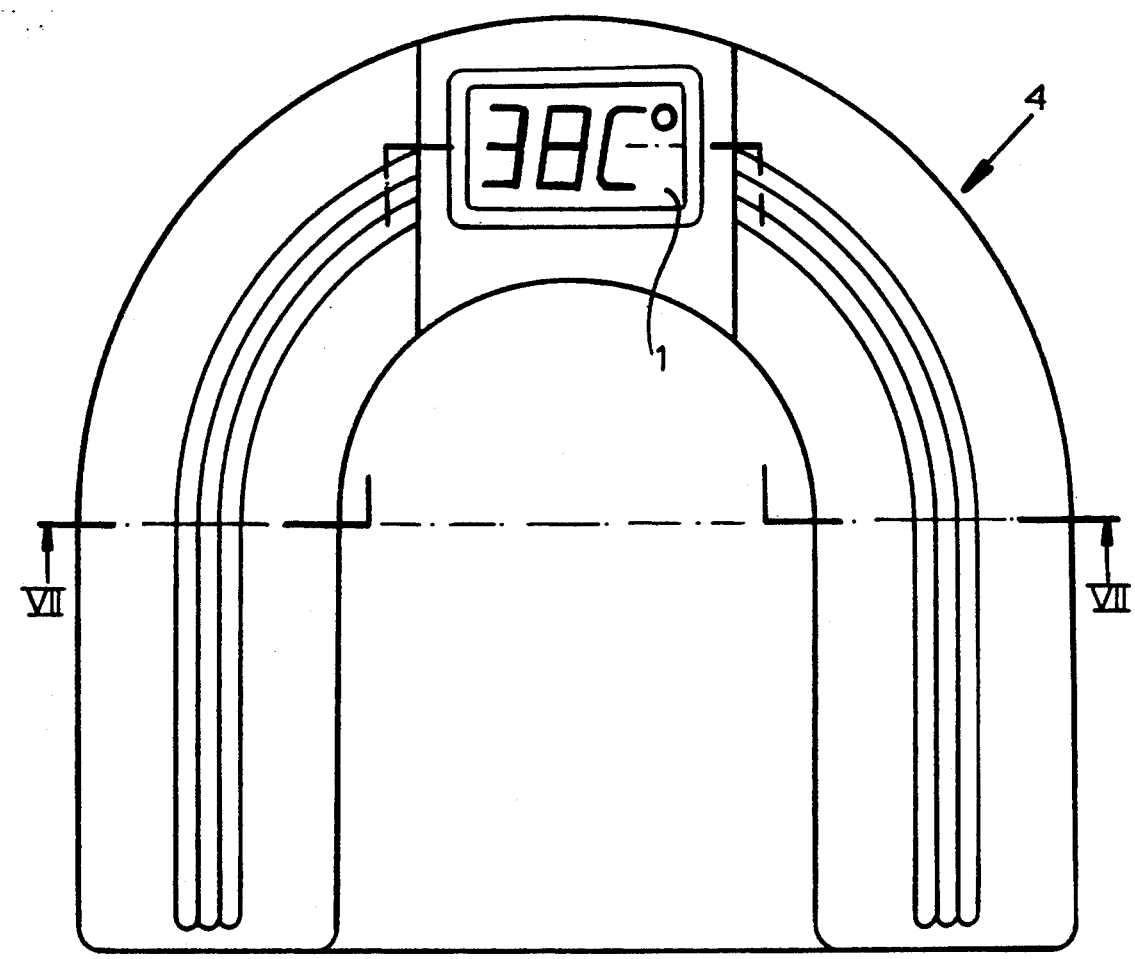
FIG. 6 is a front view of the indicator in a housing forming a valve escutcheon.
Figure 7:
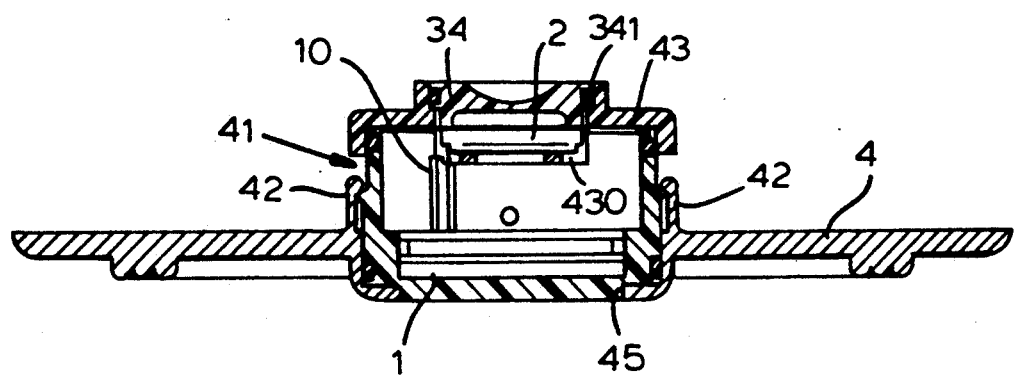
FIG. 7 is a section taken along line VII—VII of FIG. 6.
Figure 8:
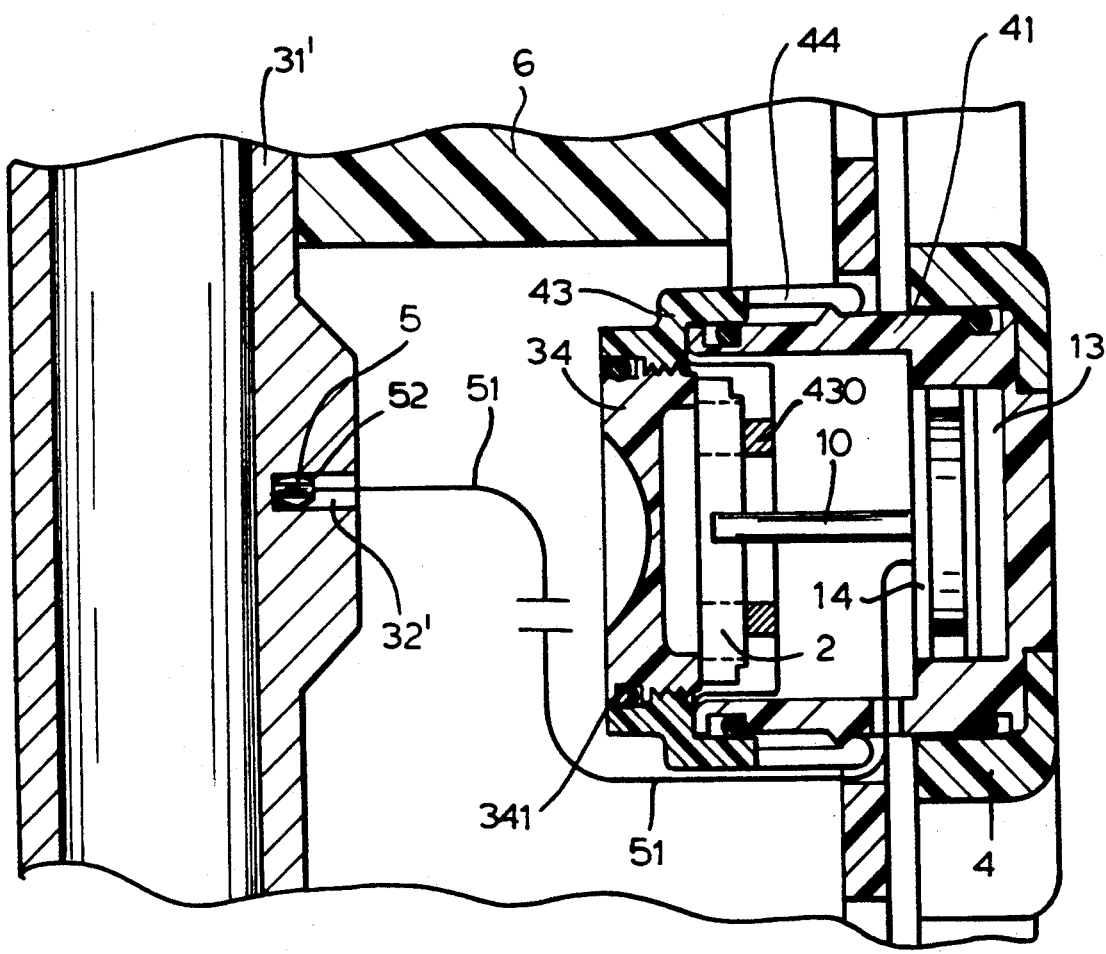
FIG. 8 is a large-scale section taken through the indicator assembly of FIGS. 6 and 7.

In the arrangement of FIGS. 6 through 8 the sensor core 1 is mounted in an escutcheon plate 4 adjacent a pipe or conduit part 31' that conducts water from an unillustrated mixing valve to a faucet, shower, or the like. The display 13 is visible through a window 45 formed in the escutcheon 4 and is held in an outer housing element 41 whose rear is closed by an inner housing element 43. The outer element 41 is held in place on the escutcheon 4 by a pair of diametrically opposite elastically deformable fingers 42 and as seen in FIG. 8 the inner housing element 43 is itself held in place on the part 41 by two more such integral holding fingers 44 that are offset by 90° to the fingers 42.

The inner element 43 is formed with an aperture 36' like the aperture 36 and holding the battery 2, with a plug 34 holding the battery 2 in place in a seat 430. In this system the battery 2 is mounted relatively close to the circuit module 14 so the finger 12 and contacts 11 have been broken off, and the shorter contacts 10 are used to connect to this battery 2. The pipe 31' is formed with a blind bore 32' in which the sensor 5 is held.

We claim:

1. A temperature indicator for use in combination with a plumbing fitting through which water passes, the indicator including:
    a core assembly including
        a display,
        a circuit module fixed to and driving the display,
        a temperature sensor connected to the circuit module,
        a pair of long battery contacts connected to the module,
        a finger extending from the module and carrying the long contacts, and
        a pair of short battery contacts connected to the module in parallel with the long contacts;
    an inner housing part interfitting with the fitting, traversed by the water, and formed with a recess in which the sensor is engageable;
    a battery connected to one of the pairs of contacts, the other pair being unused; and
    an outer housing part mounted on the inner housing part and carrying the core assembly.

2. The temperature indicator defined in claim 1 wherein the finger is constructed to break readily off the assembly.

3. The temperature indicator defined in claim 1 wherein the sensor is provided with a flexible output wire connected to the module.

4. The temperature indicator defined in claim 1 wherein the inner housing part is a tube surrounded by the outer housing part, the display and module being mounted on one side of the tube and the battery on the opposite side thereof, with the finger extending around the tube between the sides.

5. The temperature indicator defined in claim 1 wherein the outer housing part includes an escutcheon plate.

6. The temperature indicator defined in claim 5 wherein the outer housing part includes two interfitting elements together holding the core assembly and battery and secured together by snap fingers.

7. The temperature indicator defined in claim 5 wherein the outer housing part and escutcheon plate are provided with snap fingers that secure them together.

8. The temperature indicator defined in claim 1 wherein the sensor is electrical.

9. The temperature indicator defined in claim 8 wherein the sensor is provided with spring fingers retaining it in the recess.

10. The temperature indicator defined in claim 1 wherein the inner housing part is formed at least around the recess of a material that conducts heat well.

* * * * *